(No Model.)
E. MATHSON.
GATE LATCH.
No. 601,579. Patented Mar. 29, 1898.
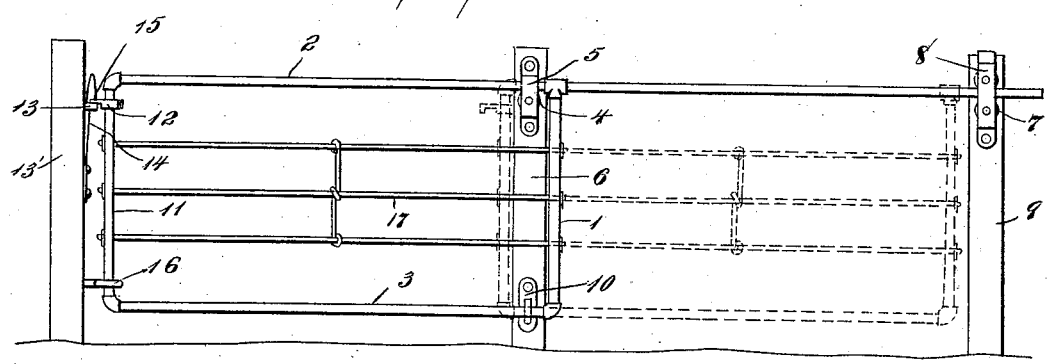
Fig. I.
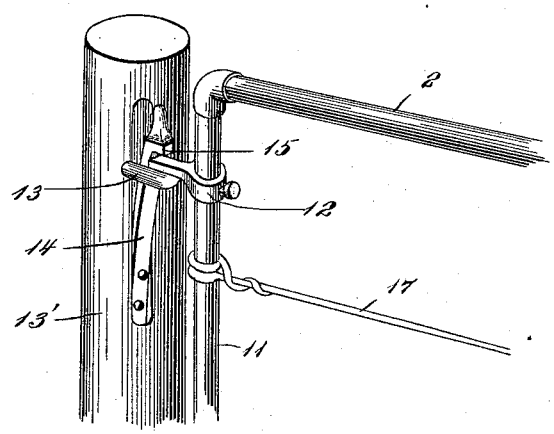
Fig. II.
Witnesses
G. O. Conner
Victor J. Evans
Inventor
Edward Mathson
by John Wedderburn
Attorney

UNITED STATES PATENT OFFICE.

EDWARD MATHSON, OF DOON, IOWA.

GATE-LATCH.

SPECIFICATION forming part of Letters Patent No. 601,579, dated March 29, 1898.

Application filed September 24, 1897. Serial No. 652,805. (No model.)

*To all whom it may concern:*

Be it known that I, EDWARD MATHSON, a citizen of the United States, residing at Doon, in the county of Lyon and State of Iowa, have invented certain new and useful Improvements in Catches or Holding Devices for Gates; and I do hereby declare the following to be a full, clear, and exact description of the invention, such as will enable others skilled in the art to which it appertains to make and use the same.

My invention relates to novel and useful improvements in catches or holding devices for sliding gates; and it has for its objects primarily to provide a simple and inexpensive latch which will be convenient of manipulation and efficient in operation.

With these and other objects in view my invention consists in the novel combination and arrangement of parts hereinafter fully described, and particularly set forth in the appended claim.

With these ends in view I have devised the gate illustrated in the accompanying drawings, in which—

Figure 1 is a side elevation, the open position of the gate being shown in dotted lines. Fig. 2 is an enlarged perspective view of the end of the gate and the gate-post, showing the means for latching or fastening the gate in closed position.

Referring to the drawings, the numeral 1 indicates the gate-frame, which I preferably construct of metallic tubing put together in such manner that a top bar 2 is formed, preferably, about twice the length of the lower bar 3 of the gate, and said gate is supported and guided in its lateral movement by reason of the top bar 2 passing over a single roller 4, mounted in suitable bearings in a keeper 5 of a post 6 and between two similar rollers 7, journaled in suitable bearings in a metallic keeper 8, rigidly secured to the post 9. The lower portion of the gate is kept in close proximity to the post 6 during the opening-and-closing movement of the gate by a short upturned metallic arm 10, secured to the post 6 in proximity to the lower end thereof.

Rigidly secured to the end bar 11 of the gate is a catch 12, adapted to enter a staple-like keeper 13, secured to the gate-post 13', through which keeper extends the upper end of a spring-arm 14, having a shoulder 15 formed near the upper end thereof, which is adapted to engage the top of the catch 12 for the purpose of locking the catch and thereby securing the gate in closed position. 16 designates a short bifurcated arm adapted to be engaged by the end bar 11 of the gate when the same is closed to keep the gate from swinging laterally from vertical position.

When it is desired to open the gate, the spring-arm 14 is moved toward the post 13', disengaging the shoulder 15 from the top of the catch 12 and permitting the gate to be elevated sufficiently to disengage the catch from the keeper, when obviously the gate can be moved to open position.

The panels of the gate are preferably formed of parallel wires 17, stayed at or about their central portions by a stay 18.

Having thus described my invention, what I claim as new, and desire to secure by Letters Patent, is—

A latch or fastener for sliding gates, embracing the combination with the end bar of the gate, of a hook or catch rigidly secured to said end bar, a gate-post having a staple or like keeper adapted to coöperate with the hook or catch, a spring-arm extending through said keeper and formed with a shoulder adapted to engage the top of the catch, whereby the catch is secured in engagement with the keeper, and a bifurcated arm on the lower portion of the post adapted to embrace the end bar of the gate and prevent the same from being moved laterally from proper position, substantially as described.

In testimony whereof I have singed this specification in the presence of two subscribing witnesses.

EDWARD MATHSON.

Witnesses:
 JOHN PAULSEN,
 C. A. NICHOLS.